United States Patent
Nohr et al.

[11] Patent Number: 5,934,743
[45] Date of Patent: Aug. 10, 1999

[54] IMPACT ABSORBING OUTER BODY STRUCTURE OF A MOTOR VEHICLE

[75] Inventors: Matthias Nohr; Herbert Mehren, both of Stuttgart, Germany

[73] Assignee: Daimler-Benz AG, Stuttgart, Germany

[21] Appl. No.: 08/844,678

[22] Filed: Apr. 21, 1997

[30] Foreign Application Priority Data

Apr. 20, 1996 [DE] Germany .................. 196 15 744

[51] Int. Cl.⁶ ..................................... B60J 7/00
[52] U.S. Cl. .................. 296/188; 296/189; 296/191; 296/146.6; 296/203.03
[58] Field of Search .................... 296/188, 189, 296/191, 146.6, 203.03; 293/107, 110, 128

[56] References Cited

U.S. PATENT DOCUMENTS

| 3,718,295 | 2/1973 | Moore ........................... 244/119 |
| 4,815,777 | 3/1989 | Campbell ....................... 293/107 |
| 5,102,163 | 4/1992 | Ishikawa ....................... 296/188 |
| 5,106,137 | 4/1992 | Curtis .......................... 293/107 |
| 5,181,697 | 1/1993 | Rumer .......................... 293/110 |
| 5,544,913 | 8/1996 | Yamanishi et al. ............. 280/730.2 |
| 5,580,119 | 12/1996 | Uchida et al. ................. 296/188 |
| 5,615,914 | 4/1997 | Galbraith et al. .............. 280/743.1 |

FOREIGN PATENT DOCUMENTS

| 27 11 338 A1 | 9/1978 | Germany . |
| 28 14 107 A1 | 10/1979 | Germany . |
| 07125603 | 5/1995 | Japan . |
| 07125604 | 5/1995 | Japan . |
| 07125605 | 5/1995 | Japan . |
| 07125606 | 5/1995 | Japan . |
| 07125607 | 5/1995 | Japan . |
| 07125608 | 5/1995 | Japan . |
| 07125609 | 5/1995 | Japan . |
| 07156749 | 6/1995 | Japan . |
| 07285466 | 10/1995 | Japan . |

*Primary Examiner*—Joseph D. Pape
*Assistant Examiner*—Kiran Patel
*Attorney, Agent, or Firm*—Evenson, McKeown, Edwards & Lenahan, P.L.L.C.

[57] ABSTRACT

An impact absorbing outer body structure of a motor vehicle including an outer panel with a deformable impact region. For the protection of a person or object making impact on the outer-panel, the deformable impact region can be displaced outwardly toward said person or object. The outer panel is provided with at least one plastically deformable impact region which is weakened in relation to the rest of the outer panel, and a supporting shell is firmly connected to the outer panel on an inner side. The supporting shell has at least the stability of the rest of the outer panel, enclosing the impact region and forming, along with the outer panel, a closed cavity. In the event of an impact load, the plastically deformable impact region can be expanded rapidly outward by means of a high-pressure charge, such as a pyrotechnical propellant charge, to provide a deformation area to absorb the energy of the impact. The impact absorbing structure is particularly used in hoods and doors of motor vehicles.

18 Claims, 1 Drawing Sheet

IMPACT ABSORBING OUTER BODY STRUCTURE OF A MOTOR VEHICLE

BACKGROUND AND SUMMARY OF THE INVENTION

This application claims the priority of German Application No. 196 15 744.7, the disclosure of which is expressly incorporated by reference herein.

The invention relates to an impact absorbing outer body structure of a motor vehicle, and more particularly to an outer body structure of a motor vehicle including an outer panel and means for the rapid displacement of at least part of the outer panel in response to an impact load. The invention also relates to a method of absorbing an impact load at an outer body structure of a motor vehicle, and a method of manufacturing an impact absorbing outer body structure of a motor vehicle.

A motor vehicle of the type generally described above is known from DE 28 14 107 A1. In order to provide improved protection for pedestrians in the event of an impact on the hood of a passenger vehicle, the hood can be raised rapidly out of its rest position into an impact position upon detection of an impact load. For the purpose of raising the hood approximately to the level of a cowl panel in front of a windshield of the passenger vehicle, an air-bag device is provided, which is triggered by appropriate signals of an impact sensor system. In order to permit upward displacement of the hood, the lock of the hood is released, and the air-bag device pivots the hood upwards, around its front hinge axis, by a certain distance.

A similar means for protecting pedestrians is provided in a motor vehicle according to DE 27 11 338 A1.

Japanese patent document JP 07156749 A discloses a motor vehicle having front, top body outer-panel regions provided with air-bag arrangements which, in the event of the motor vehicle colliding with a pedestrian, inflate and thus damp the impact of the pedestrian on the vehicle.

Japanese patent document JP 07125603 A discloses a similar means of protecting a pedestrian, a front region of the hood of the motor vehicle being provided with an opening from which an air bag can inflate in the event of pedestrian impact.

In Japanese patent document JP 07125604 A, the hood of a motor vehicle is covered by a soft sheet-like structure, similar to a netting, which can be stretched out in a matlike manner in the event of a collision with a pedestrian in order thus to cushion the impact of the pedestrian on the hood.

Japanese patent document JP 07125605 A discloses an air-bag arrangement on the hood of the motor vehicle which, in the inflated state, damps the impact of a pedestrian on the hood.

It is also known, from Japanese patent document JP 07125606 A, to provide a flap in the hood of the motor vehicle, an air-bag arrangement which can expand rapidly being provided beneath said flap. In the event of a collision of the motor vehicle, in particular, with a pedestrian, the air-bag arrangement is inflated such that it extends upward beyond the top of the hood and toward the windshield of the motor vehicle.

It is also known, from Japanese patent document JP 07125607 A, to provide a vertically displaceable cover in the hood of a motor vehicle. This cover is connected to an air-bag arrangement such that it is displaced vertically upward in the event of the air bag expanding. The air bag expands in the event of a collision between the motor vehicle and a pedestrian, as a result of which the pedestrian makes impact on the cover, which has been displaced vertically upwards, and this cover is deformed. The cover constitutes a component which is separate from the rest of the hood.

Japanese patent document JP 07125608 A discloses a motor vehicle having a hood provided with an opening for the expansion of an air-bag arrangement. When the air-bag arrangement is in the collapsed, rest state, this opening is closed by two push-open covers which are moved into their open position, in which the opening in the vehicle hood is exposed, in dependence on the air bag expanding.

A similar covering means for an air bag in the hood of a motor vehicle is known from Japanese patent document JP 07125609 A. In the case of this means for protecting a pedestrian, the opening in the hood is closed off by a pivotable flap which, for release of the air bag, is pivoted, towards the windshield, into its open end position.

Objects of the invention are to provide an impact absorbing outer body structure of a motor vehicle of the type generally described above which is relatively simple and compact, while providing improved impact protection for both pedestrians and other types of impact loads.

These and other objects have been achieved according to the present invention by providing an impact absorbing outer body structure of a motor vehicle, comprising: an outer body panel having at least one plastically deformable impact region; a supporting shell firmly connected to an inner side of the outer body panel such that a closed cavity is defined between the supporting shell and the impact region; and a high pressure charge which is dischargeable into the closed cavity in response to an impact load in order to deform the impact region of the outer body panel outwardly.

These and other objects have also been achieved according to the present invention by providing a method of absorbing an impact load at an outer body structure of a motor vehicle, comprising the steps of: providing an outer body panel having at least one plastically deformable impact region; connecting a supporting shell to an inner side of the outer body panel such that a closed cavity is defined between the supporting shell and the impact region; sensing an impact load; and pressurizing the closed cavity in response to an impact load such that the impact region of the outer body panel is deformed outwardly.

These and other objects have also been achieved according to the present invention by providing a method of manufacturing an impact absorbing outer body structure of a motor vehicle, comprising the steps of: forming an outer body panel having at least one plastically deformable impact region having a thickness less than a thickness of the rest of the outer body panel; forming a supporting shell having a thickness at least as great as the thickness of the rest of the outer body panel; connecting the supporting shell to an inner side of the outer body panel such that a closed cavity is defined between the supporting shell and the impact region; arranging an impact sensor system on the motor vehicle to sense an impact load; and arranging a high pressure discharge means in communication with the closed cavity and operatively connected to the impact sensor.

The present invention can be used, in particular, on hoods of motor vehicles, which are usually positioned relatively closely above a rigid drive unit, without the anchoring means of the hood having to be released. However, the solution according to the invention may also advantageously be used in vehicle side doors, in order for it to be possible for the impact energy of a side-impact load to be dissipated effectively in the side door. Upon detection of an impact load by a corresponding impact sensor system, the cavity between the supporting shell and the impact region of the outer panel is, in a simple manner, rapidly subjected to high pressure. The high pressure buckles the impact region of the outer panel buckles outward and curves the outer panel toward the person or object making impact thereon, resulting in a relatively large deformation distance between the impact region of the outer panel and the supporting shell for the dissipation of the impact energy. In this arrangement, the supporting shell need not necessarily be completely rigid. Even with the required space for the supporting shell beneath the outer panel, it is possible, in addition to the outer panel buckling, for the supporting shell to be deformed correspondingly in the opposite direction, towards the interior of the vehicle, with the result that both the is outer panel and the supporting shell are forced apart from one another by a certain distance.

In one preferred embodiment of the invention, the impact region of the outer panel has a wall thickness which is reduced in relation to the rest of the outer panel. This is a particularly simple configuration of the invention in order for the outer panel to be weakened effectively, and rendered sufficiently plastically deformable, in its impact region. Rupturing or breaking of the outer panel in the buckled state has to be avoided in order to prevent any additional injury hazards. Depending on material selection, however, it is also possible to weaken the outer panel in the impact region in another way. The outer panel may also be weakened, in particular, by dispensing with stiffening elements, such as stiffening beads, stiffening ribs or the like, in the impact region.

In a further configuration of the invention, the supporting shell is supported, towards the interior of the vehicle, on a functional unit, in particular a drive unit, which is fixed to the vehicle. This prevents the supporting shell from buckling too far inward due to excessive pressure loading, which could result in a reduction in the buckling of the impact region of the outer panel. It is precisely as a result of the impact region buckling outward to a sufficient extent, however, that desired early contact of the person or object with the outer panel, and thus with the body part, is achieved, this contact resulting in energy being absorbed at a relatively early stage, and thus in energy being dissipated to a certain extent before the person or object comes into contact with fixed block-type parts of the motor vehicle.

These and other objects, features and advantages of the present invention will become more readily apparent from the following detailed description when taken in conjunction with the accompanying drawings.

DETAILED DESCRIPTION OF THE DRAWINGS

Figure 1:
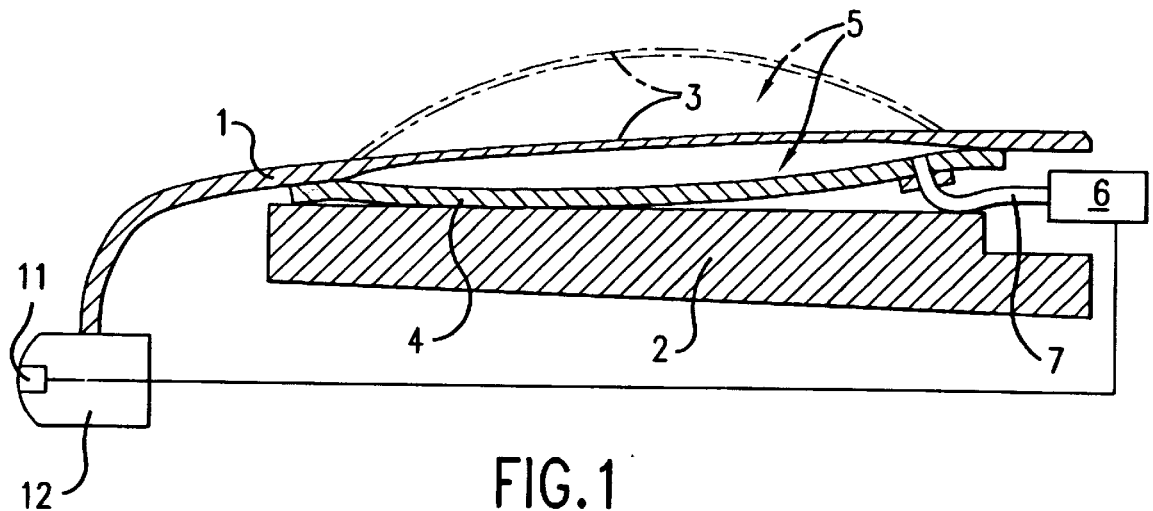
FIG. 1 shows lateral sectional view of an impact absorbing outer body structure of a motor vehicle in the form of a hood, according to a preferred embodiment of the present invention.

Referring to FIG. 1, as is known per se, a motor vehicle has a hood at the front end which constitutes part of the body of the motor vehicle and is provided with an outer body panel (1) which forms the outer contour of the hood. A drive unit (2) is arranged beneath the hood, in the form of a block, at a small distance beneath the outer panel (1). In the event of a pedestrian making impact on the hood, in order to prevent said pedestrian from coming into contact with the block-type drive unit (2), and thus possibly sustaining serious injuries, after the outer panel (1) has been deformed just a small distance inward, said outer panel (1) of the hood has a large-surface-area impact region (3) which is plastically deformable to a pronounced extent in relation to the rest of the outer panel (1).

According to the illustrated preferred embodiment, the outer panel (1) is weakened in the impact region (3) in order to achieve the increased deformability by reducing the wall thickness of the outer panel (1) in the impact region (3). A supporting shell (4) having a wall thickness corresponding approximately to the normal wall thickness of the outer panel (1), i.e. the wall thickness of the non-impact regions, is attached to the inner side of the outer panel (1) directed towards the drive unit (2), level with the impact region (3). The material of the supporting shell (4) also corresponds to the material of the outer panel (1). Both the outer panel (1) and the supporting shell (4) are produced from sheet metal. The supporting shell (4) corresponds approximately to the surface area of the impact region (3) and its peripheral border is connected tightly all the way around to the outer panel (1), for example by means of welding, and said supporting shell thus forms, together with the impact region (3), a tightly sealed, narrow closed cavity (5). The underside of the supporting shell (4) is located directly above the drive unit (2).

The closed cavity (5) is connected, via a pressure valve and a pressure line (7), to a pressure accumulator (6) in which a high pressure charge, such as a pyrotechnical propellant charge, is integrated. The pyrotechnical propellant charge is operatively connected to an impact sensor system (11) in a manner known per se. In the embodiment shown in FIG. 1, the impact sensor system (11) is mounted in the front bumper (12) of the motor vehicle to sense a frontal impact. The pyrotechnical propellant charge is ignited in the event of an appropriate signal from the impact sensor system, and is discharged into the closed cavity (5) via the pressure line (7). Consequently, the cavity (5) between the impact region (3) and the supporting shell (4) is rapidly subjected to high excess pressure, by means of which the impact region (3) of the outer panel (1) is buckled outward as illustrated in FIG. 1 by dot-dash lines. The considerably more stable supporting shell (4), due to its greater wall thickness, is merely forced slightly inward and is supported on the drive unit (2). The pedestrian making impact on the upwardly buckled impact region (3) comes into contact with the outer panel (1) of the hood at an early stage as a result of the impact region (3) having been deformed upward. This results in an increased deformation distance for the outer panel (1) in the impact region (3), allowing a certain proportion of the impact energy to be dissipated over this distance, with the result that the impact of the pedestrian is cushioned comparatively well.

Figure 2:
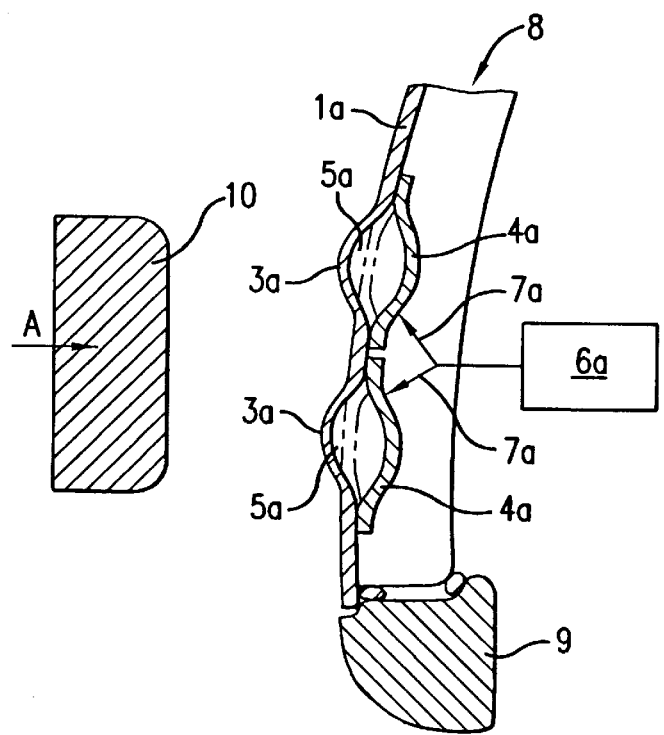
FIG. 2 shows a sectional view of an impact absorbing outer body structure of a motor vehicle in the form of a side door, according to another preferred embodiment of the present invention.

The function of the preferred embodiment according to FIG. 2 corresponds essentially to the function described above with reference to FIG. 1. In the case of the FIG. 2 embodiment, however, two weakened impact regions (3a) are arranged at a distance one above the other in an outer panel (1a) of a body part in the form of a side door (8) for a motor vehicle. As is known per se, the bottom of the side door (8) terminates flush with a door sill (9), which forms part of the body load-bearing structure of the motor vehicle. The two impact regions (3a) constitute a weakened part of the outer panel (1a), the weakening being achieved, analogously to the embodiment shown in FIG. 1, by a reduction in the wall thickness of the outer panel (1a). Analogously to the embodiment shown in FIG. 1, a supporting shell (4a) is assigned to each impact region (3a) on an inner side, said supporting shell being considerably more stable than the impact region (3a) and its border tightly enclosing the impact region (3a), in order to form a closed cavity (5a). The outer panel (1a), the impact region (3a), and the supporting shell (4a) are each produced from sheet metal. In order to form the tightly sealed cavities (5a), the supporting shells (4a) are welded to the inner side of the cuter panel (1a). A branched pressure line (7a) connects the two cavities (5a) to a common pressure accumulator (6a), which, corresponding to FIG. 1, is provided with a high pressure charge, such as a pyrotechnical propellant charge which, in turn, is operably connected to a known impact sensor system. This impact sensor system responds, in particular, to a side-impact load exerted, in arrow direction (A), by an object (10), for example during a collision with another motor vehicle. As a result of the rapid inflation of the cavities (5a), the impact regions (3a) are buckled outward from the normal position shown in dot-dash lines in FIG. 2 into the position shown in solid lines in FIG. 2. At the same time, the supporting shells (4a) are buckled inward by a correspondingly smaller amount, due to their increased rigidity, resulting in a relatively wide cavity (5a) which provides a substantial deformation distance for the dissipation of the impact energy of the object (10).

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An impact absorbing outer body structure of a motor vehicle, comprising:
   an outer motor vehicle body panel having at least one plastically deformable impact region;
   a supporting shell fixed to an inner side of the outer motor vehicle body panel such that a closed cavity is defined between the supporting shell and the impact region; and
   a high pressure charge which is dischargeable into said closed cavity in response to an impact load in order to deform said impact region of the outer motor vehicle body panel outwardly.

2. An impact absorbing outer body structure of a motor vehicle according to claim 1, wherein said plastically deformable impact region of the outer motor vehicle body panel is weakened relative to a remaining portion of the outer motor vehicle body panel.

3. An impact absorbing outer body structure of a motor vehicle according to claim 1, wherein said plastically deformable impact region of the outer motor vehicle body panel has a thickness which is less than a thickness of a remaining portion of the outer motor vehicle body panel.

4. An impact absorbing outer body structure of a motor vehicle according to claim 2, wherein said supporting shell has a stability which is at least as great as a stability of the remaining portion of the outer motor vehicle body panel.

5. An impact absorbing outer body structure of a motor vehicle according to claim 3, wherein said supporting shell has a thickness which is at least as great as the thickness of the remaining portion of the outer motor vehicle body panel.

6. An impact absorbing outer body structure of a motor vehicle according to claim 1, wherein said high pressure charge comprises a pyrotechnical propellant charge.

7. An impact absorbing outer body structure of a motor vehicle according to claim 5, wherein said high pressure charge comprises a pyrotechnical propellant charge.

8. An impact absorbing outer body structure of a motor vehicle according to claim 1, wherein a side of the supporting shell facing the interior of the motor vehicle is supported on a drive unit which is fixed to the motor vehicle.

9. An impact absorbing outer body structure of a motor vehicle according to claim 3, wherein a side of the supporting shell facing the interior of the motor vehicle is supported on a drive unit which is fixed to the motor vehicle.

10. An impact absorbing outer body structure of a motor vehicle according to claim 7, wherein a side of the supporting shell facing the interior of the motor vehicle is supported on a drive unit which is fixed to the motor vehicle.

11. An impact absorbing outer body structure of a motor vehicle according to claim 1, further comprising an impact sensor system mounted on said motor vehicle to sense said impact load, and wherein said high pressure charge is a pyrotechnical propellant charge produced by a pressure accumulator, said impact sensor system being connected to said pressure accumulator.

12. An impact absorbing outer body structure of a motor vehicle according to claim 1, wherein said outer motor vehicle body panel and said supporting shell are formed from sheet metal.

13. An impact absorbing outer body structure of a motor vehicle according to claim 1, wherein said outer motor vehicle body panel comprises a hood of said motor vehicle.

14. An impact absorbing outer body structure of a motor vehicle according to claim 1, wherein said outer motor vehicle body panel comprises a door of said motor vehicle.

15. A method of absorbing an impact load at an outer body structure of a motor vehicle, comprising the steps of:
   providing an outer motor vehicle body panel having at least one plastically deformable impact region;
   connecting a supporting shell to an inner side of the outer motor vehicle body panel such that a closed cavity is defined between the supporting shell and the impact region;

sensing an impact load; and pressurizing said closed cavity in response to an impact load such that said impact region of the outer motor vehicle body panel is deformed outwardly.

16. A method of absorbing an impact load at an outer body structure of a motor vehicle according to claim 15, wherein said pressurizing step comprises discharging a pyrotechnical propellant charge into said closed cavity.

17. A method of manufacturing an impact absorbing outer body structure of a motor vehicle, comprising the steps of:

forming an outer motor vehicle body panel having at least one plastically deformable impact region having a thickness less than a thickness of a remaining portion of the outer motor vehicle body panel;

forming a supporting shell having a thickness at least as great as the thickness of the remaining portion of the outer motor vehicle body panel;

connecting said supporting shell to an inner side of the outer motor vehicle body panel such that a closed cavity is defined between the supporting shell and the impact region;

arranging an impact sensor system on said motor vehicle to sense an impact load; and arranging a high pressure discharge means in communication with said closed cavity and connected to said impact sensor system.

18. A method of manufacturing an impact absorbing outer body structure of a motor vehicle according to claim 17, wherein said high pressure discharge means comprises a pressure accumulator containing a pyrotechnical propellant charge.

* * * * *